US011559070B2

(12) United States Patent
Van Erp (10) Patent No.: US 11,559,070 B2
(45) Date of Patent: Jan. 24, 2023

(54) APPARATUS AND METHOD TO HEAT ANIMAL RAW FAT MATERIAL TO PRODUCE FAT (71) Applicant: GEA FOOD SOLUTIONS BAKEL B.V., Bakel (NL)

(72) Inventor: Joost Van Erp, Nuenen (NL)

(73) Assignee: GEA MECHANICAL EQUIPMENT GMBH, Oelde (DE)

( * ) Notice: Subject to any disclaimer, the term of this patent is extended or adjusted under 35 U.S.C. 154(b) by 518 days.

(21) Appl. No.: 16/609,515

(22) PCT Filed: May 9, 2018

(86) PCT No.: PCT/EP2018/061997
§ 371 (c)(1),
(2) Date: Oct. 30, 2019

(87) PCT Pub. No.: WO2018/206637
PCT Pub. Date: Nov. 15, 2018

(65) Prior Publication Data
US 2020/0068930 A1 Mar. 5, 2020

(30) Foreign Application Priority Data

May 9, 2017 (EP) ..................................... 17170103

(51) Int. Cl.
*A23L 5/30* (2016.01)
*C11B 1/12* (2006.01)
(Continued)

(52) U.S. Cl.
CPC ................ *A23L 5/34* (2016.08); *A21D 15/06* (2013.01); *A23L 3/01* (2013.01); *C11B 1/12* (2013.01)

(58) Field of Classification Search
CPC ... A23L 5/34; A23L 3/01; A21D 15/06; C11B 1/12
(Continued)

(56) References Cited

U.S. PATENT DOCUMENTS 4,457,220 A 7/1984 Entremont et al.
5,253,567 A 10/1993 Gunawardena
(Continued)

FOREIGN PATENT DOCUMENTS

CN 102986756 A 3/2013
CN 105698228 A 6/2016
(Continued)

OTHER PUBLICATIONS

International Search Report and Written Opinion for International Application No. PCT/EP2018/061997, dated Jun. 29, 2018.
(Continued)

*Primary Examiner* — Brent T O'Hern
(74) *Attorney, Agent, or Firm* — The Dobrusin Law Firm, P.C.

(57) ABSTRACT

A processing apparatus to melt animal fat, in which an animal raw fat material is transported by a pump, through a microwave chamber and heated, the processing apparatus includes at least one solid-state radio frequency source that is configured to generate microwave energy, one or more sensors, and a control system. The at least one solid-state radio frequency source is configured to generate and transmit the microwave energy to the animal raw fat material, the one or more sensors are configured to measure the microwave energy that is reflected from the animal raw fat material, and the control system is configured to compare the transmitted microwave energy to the reflected microwave energy and then, based on the comparison, the control system is configured to adjust any additional microwave
(Continued)

energy that is transmitted by the at least one solid-state radio frequency source to the animal raw fat material.

20 Claims, 9 Drawing Sheets (51) Int. Cl.
*A21D 15/06* (2006.01)
*A23L 3/01* (2006.01)
(58) Field of Classification Search
USPC .......................................................... 219/687
See application file for complete search history.

(56) References Cited

U.S. PATENT DOCUMENTS

| 6,246,040 | B1* | 6/2001 | Gunn | H05B 6/48 |
| | | | | 331/46 |
| 2006/0006172 | A1 | 1/2006 | Sedlmayr | |
| 2011/0033584 | A1 | 2/2011 | Bilchinsky et al. | |
| 2011/0159103 | A1 | 6/2011 | Akashe et al. | |
| 2012/0103975 | A1 | 5/2012 | Okajima | |
| 2015/0271877 | A1 | 9/2015 | Johansson | |
| 2016/0278170 | A1 | 9/2016 | Atherton et al. | |
| 2016/0324195 | A1 | 11/2016 | Simunovic et al. | |

FOREIGN PATENT DOCUMENTS

| EP | 2322883 | A1 | 5/2011 |
| FR | 2264494 | A1 | 10/1975 |
| GB | 2098040 | A | 11/1982 |
| JP | H07255388 | A | 10/1995 |
| RO | 125073 | B1 | 9/2010 |
| WO | 2009/116923 | A1 | 9/2009 |
| WO | 2014/147651 | A1 | 9/2014 |
| WO | 2016/100539 | A1 | 6/2016 |

OTHER PUBLICATIONS

International Preliminary Report on Patentability for International Application PCT/EP2018/061997, dated Aug. 7, 2019.
Yadav Deep et al—Microwave technology for disinfestation of cereals and pulses, pp. 3568-3576, dated Dec. 16, 2012.
XP002781829—Database WPI, Week 201349, DB accession No. 2013-K85640; & CN 102 986 756 A, Mar. 27, 2013.

* cited by examiner

APPARATUS AND METHOD TO HEAT ANIMAL RAW FAT MATERIAL TO PRODUCE FAT

CROSS-REFERENCE TO RELATED APPLICATIONS

This application is a US National Stage of PCT/EP2018/061997 filed on May 9, 2018, which claims priority to EP 17170103.0 filed on May 9, 2017, all of which are hereby incorporated by reference herein for all purposes.

FIELD

The present invention relates to a processing apparatus to melt animal fat, in which an animal raw fat material is transported by a means, preferably a pump, through a microwave chamber and thereby heated. The present invention further relates to a method to heat animal raw fat material with radio-frequency waves.

BACKGROUND

Animal fat such as pork fat is widely used e.g. as an ingredient in the bakery industry and is used for frying and baking. Other applications wherein animal fat will be used are food, pet food, as a component within soap, detergents, cosmetics and Bio diesel. Pork skin for instance has a high amount of collagen, which can be used for special purposes for instance in the gelatin industry.

SUMMARY

It is therefore the objective of the present invention to provide a processing apparatus and a method to improve the melting of animal fat.

The problem is attained with a processing apparatus to melt animal raw fat, in which an animal raw fat material is transported by a means, preferably a pump, through a microwave chamber and thereby heated, characterized in, that it comprises at least one, preferably a multitude, solid-state radio frequency source(s).

The disclosure made regarding this subject matter of the present invention also applies to the other invention and vice versa. Subject matters disclosed regarding this invention can also be combined with subject matters from other inventions of the present application.

The present invention relates to a processing apparatus with a solid-state radio frequency (RF)-transistor(s) in a RF power amplifier. A radio frequency power amplifier is an electronic amplifier, that converts a low power radio frequency signal into a higher power signal.

Typically, RF-power amplifiers drive the antenna of a transmitter. The antenna can be coupled to and/or located in a waveguide, wherein the antenna can radiate the radio frequency waves, preferably the microwaves, into the waveguide which preferably is designed of reflective material and can guide the radio frequency waves, preferably the micro waves, to a desired location, for example into the product chamber wherein the animal raw fat material to be heated is located. Compared to a magnetron, an advantages of a solid-state RF energy technology is a low voltage drive, semiconductor reliability and lower energy consumption due to the advanced control system.

Animal raw fat material according to the present invention are by-products from the meat industry which can be recovered from pork, beef, sheep or the like. Preferably animal raw fat material is the skin of the animal and/or the subcutaneous fat. Preferably, the animal raw fat material is raw and/or cooled. According to a preferred embodiment of the present invention, the animal raw fat material is crushed, preferably ground.

The animal raw fat material is heated, preferably up to a point at which the fat becomes liquid or at least partially liquid, so that it can be separated from the remaining texture of the animal material.

The inventive processing apparatus comprises a means, preferably a pump and/or a conveyor, which transports the animal raw fat material past the solid-state radio frequency source(s). The means can also add a certain potential energy to the animal material, so that it can be driven by gravitational force past the solid-state radio frequency source(s).

Inventively, the animal raw fat material will be exposed to the radio-frequency-, preferably microwave energy, in a microwave chamber, which is according to a preferred embodiment a tube. The microwave chamber, preferably the tube, is preferably made from a material which is at least essentially transparent for radio-frequency radiation, preferably microwaves, and is hence not or only little heated by the radio-frequency-energy. Preferably, the inner area of the tube is 0.03 m$^2$-0.1 m$^2$ and/or the inner diameter of the pipe is preferably between 0.2 m and 0.35 m. Preferably, the microwave chamber comprises a mixing device. In case of a tube, the mixing device is preferably a static mixer.

According to a preferred embodiment of the present invention, the inventive apparatus may not only comprise one but a multitude of solid-state radio frequency sources. This can be accomplished by using one or more antennas and/or one or more waveguides. Each radio frequency source can be preferably powered individually and each radio frequency source can be preferably controlled, more preferably closed loop controlled, more preferably individually. Preferably, the wavelength, amplitude and/or the direction of the radiation can be controlled.

The solid-state radio frequency sources are preferably provided in an array of n columns and m rows, wherein n is an integer >1 and m is an integer ≥1. Preferably, the solid-state radio frequencies are arranged equidistantly in one row and/or the columns are also arranged equidistantly. In case a multitude of sources, they can be arranged at random.

Preferably, the solid-state radio frequency sources are provided equidistantly around the circumference of product chamber. In this chamber, the animal raw fat material to be treated will be placed or it will be transported through this product chamber.

According to a preferred embodiment, the processing apparatus comprises an inlet and an outlet, which are spaced apart from each other relative to the flow direction of the animal raw fat material. The animal raw fat material enters the apparatus, preferably the product chamber, through the inlet, passes through the apparatus/product chamber and then exits the apparatus/product chamber through the exit which is different from the inlet.

Preferably, the inventive processing apparatus comprises means to transport the animal raw fat material past the solid-state radio frequency source(s). These means can be a tube and a pump, which pumps the animal raw fat material through the tube. The tube is in the present case the product chamber. Preferably, the tube is at least partially made from a material, that is at least partially transmittable, preferably transparent for the RF-radiation. The tube can for example be made from a plastic- and/or quartz-material, preferably from a food grade plastic material as long as it is at least partially transparent for microwaves. The pump pumps the animal raw fat material preferably as a continuous or semi-continuous stream past the RF-source(s). The speed at which the product is pumped is preferably adjustable, so that the residence time in the product chamber can be varied.

Alternatively or additionally, the product chamber is suitable for batch processing, e.g. a tank or the like. The product chamber is at least partially made from a material, that is at least partially transmittable, preferably transparent for the RF-radiation. The product chamber can for example be made from a plastic- and/or quartz-material, preferably from a food grade plastic material as long as it is at least partially transparent for microwaves.

Preferably, the processing apparatus comprises a control system to control the solid-state radio frequency sources and/or the means to transport the animal raw fat material. The control system preferably comprises one or more sensors, whose signal(s) is used to control one or more solid-state radio frequency source(s), preferably individually and/or related to each other and/or the control system controls the pump. In an application pumping the animal raw fat material through a tube, gradually heating of the animal raw fat material can be achieved by controlling the electromagnetic fields by controlling the power level, frequency and/or phase versus time with such precision that, for example, an even energy distribution in the product chamber or in the product will be achieved. The RF-energy load can be adapted to the progress of the treatment process. For instance, during heating the RF-energy load can change. This change in load can be detected, for example via the antenna by measuring the reflected energy. The control system will compare the transmitted energy via the antenna with the reflected energy and will consequently adjust the energy to be transmitted by the antenna. At each solid-state RF energy sources, the amplitude, the frequency and/or the phase can be controlled individually and/or in groups. The antenna may function as a sensor, for example to detect the radiation reflected from the animal raw fat material to be treated.

The sensor can sense one or more properties of the animal raw fat material, for example its temperature and/or the energy absorbed by the animal material. One sensor can measure what kind of radiation is reflected from the animal raw fat material, for example the wavelength. Since the animal raw fat material is transported during its treatment with the RF-radiation, there can be multiple sensors along the transportation path. The local reading of the sensors can be used to control the corresponding local solid-state radio frequency source(s) and/or the solid-state radio frequency source(s) upstream and/or downstream from the respective sensor. In a preferred embodiment, the sensor is a thermocouple, for example a PT100 and/or an infrared temperature sensor.

Alternatively or additionally, the pump can be controlled, for example based on the signal of the sensor and the capacity of the pump can be increased or decreased to alter the residence time in the microwave chamber, particularly the tube.

The inventive processing apparatus is preferably part of an animal fat production line which comprises one or more treatment stations.

Another preferred or inventive embodiment of the present invention is therefore an animal fat production line, particularly a production line comprising the inventive apparatus.

The disclosure made regarding this subject matter of the present invention also applies to the other invention and vice versa. Subject matters disclosed regarding this invention can also be combined with subject matters from other inventions of the present application.

In the inventive line, the microwave radiation provided by the solid-state radio frequency source(s), can be utilized to preheat the animal raw fat material and/or to execute the entire heating of the animal raw fat material by the microwave energy provided by the solid-state radio frequency source(s)

According to another preferred embodiment, the inventive apparatus is provided together with a crusher, like a grinder or a cutter, a solid-liquid separator, a liquid-liquid separator, cooling unit and/or packaging unit. Each separator can be a combination of centrifuges, for example a decanter, two or three-phase, and/or disc stack separator(s)"

The problem is also solved with a method to heat animal raw fat material with radio-frequency waves, wherein the radio-frequency waves are provided with one or more solid-state radio frequency source(s).

The disclosure made regarding this subject matter of the present invention also applies to the other invention and vice versa. Subject matters disclosed regarding this invention can also be combined with subject matters from other inventions of the present application.

Preferably the animal raw fat material is transported from an inlet of a treatment apparatus to an exit of the same apparatus which are spaced apart.

Preferably one or more sensors are provided which measure one or more properties of the product, edible or inedible (Kat.3 material) and/or the radiation reflected from the product. The product-properties are preferably measured at least twice during its treatment with RF-radiation. The changes of the properties are determined and can be taken into account when controlling the solid-state radio frequency source(s) and/or a pump which pumps the animal raw fat material through a microwave chamber, preferably a tube.

The animal raw fat material is heated, preferably up to a point at which the fat in the animal raw fat material becomes liquid or at least partially liquid, so that it can be separated from the remaining texture of the animal raw fat material.

Transistor technology generates powerful RF fields. Preferably multiple RF sources will be applied, the sources can be controlled individually and preferably related to each other. For instance, in an application pumping a mass through a tube, gradually heating of the animal raw fat material can be achieved by controlling the electromagnetic fields by controlling the power level, frequency and phase versus time with such precision that an even energy distribution will be achieved. In general, in case of a change in load in a certain spot of the product, mass, product flow or mass flow, the controller can control the specific parameters parameter in that certain spot in order to correct the adverse effects of the load change. For instance, during heating the load will change constantly, this change in load will be detected via the antenna by measuring the reflected energy. The control system will compare the transmitted energy via the antenna with the reflected energy and will consequently adjust the energy to be transmitted by the antenna. For instance, if no load is present within the product chamber, no energy will be absorbed, the antenna receives the reflected energy and the control unit will stop transmitting new energy to the product chamber. With solid-state RF energy sources, the amplitude, the frequency and the phase can be controlled for each and every antenna. Such an advanced energy management system based on a fast response to the heat demand in certain spots of the product(s) to be heated prevents damaging of internal component and prevents an uncontrolled product treatment with uneven energy distribution. Due to the efficient use of energy resulting in less energy loss an additional advantage of solid-state RF energy sources is an increase in yield of products to be treated.

Preferably, the animal raw fat material is transported continuously and/or intermittently prior during heating and/or afterwards.

Preferably, one or more sensors are provided which measure one or more properties of the animal material, the resulting fat and/or the radiation reflected from the animal raw fat material and/or the fat. The signal of the sensor(s) is preferably utilized to control the solid-state radio frequency source(s) (6) and/or a means, preferably a pump, which transports the animal raw fat material and/or the fat past the solid-state radio frequency source(s) (6).

According to a preferred embodiment, the animal raw fat material is crushed, particularly prior to the heating with radio-frequency radiation. The crushing can be executed with a grinder or a cutter. Preferably, the control unit, that controls the solid-state radio frequency source(s), also controls the grinder. The grinder is preferably controlled such, that the average particle size of the animal raw fat material is optimized for the melting of its fat content. The crusher is located upstream from the inventive apparatus and preferably operates continuously or semi-continuously. The crusher, for example in case it is a grinder can be utilized as a pump to transport the meat material past the solid-state radio frequency source(s).

Downstream from the inventive apparatus, the fat and the animal raw fat material are preferably mechanically separated.

BRIEF DESCRIPTION OF THE DRAWINGS

The inventions are now explained according to the Figures. The explanations apply for all embodiments of the present invention likewise.

DETAILED DESCRIPTION

Figure 1:
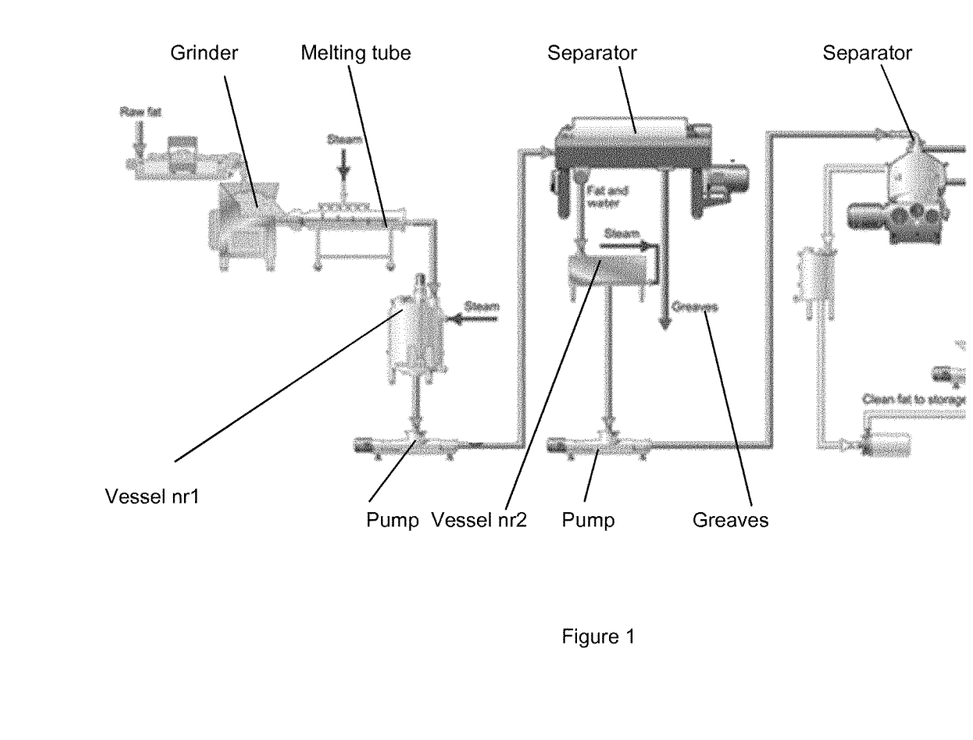
FIG. 1 shows the simplified fat melting process according the state in the art.

FIG. 1 depicts the animal fat production process according to the state in the art. The animal raw fat material, preferably a raw material, for example meat, for instance pork skin with a high amount of collagen or meat from a cow, a sheep or the like will be received within a hopper and from thereon transported preferably through a metal detector and if metal parts are detected the animal raw fat material will be discarded. The metal detector may be based upon electromagnetic field analysis. Then the raw material will be feed into a crusher, here a grinder. The minced animal raw fat material will be transported to a melting tube. In the melting tube steam is injected directly to the minced meat.

After steam injection the product/mass consisting of animal meat and steam and/or condensed water, will, in a second process step, be further heated in vessel nr1. This vessel nr1 is in one embodiment provided with a single jacket wherein heat is injected direct into the product. In another embodiment vessel nr1 is provided with a double jacket wherein steam is introduced which steam will condense against the vessel wall and will consequently heat up the animal raw fat material/mass within the vessel without adding water to the mass. The condensing steam will heat up the walls of the vessel and via the walls the animal raw fat material/mass will be further heated. Heating will be done till a preferred temperature range of 80-90° C. is achieved to melt the fat and to be able to separate fat later on in the separation process from the remaining meat structure.

Via a pump the meat mass/slurry is transported to one or more centrifuges (general for both decanters and disc stack separators), here a decanter, in order to separate the solid and hard particles within the mass from the liquid part, i.e. fat and water. The solid particles, so-called greaves, can thereafter be used for all kind of applications, in case of an edible meat mass the greaves can be used for human consumption. Preferably the greaves will be cooled, with for instance $CO_2$ or dried by various technologies.

The liquid phase from the decanter is separated by disc stack separators into clean fat, stickwater and solids. In case a three-phase separating decanter is used the various liquid streams being discharged can be further polished or de-fatted by disk stack separators. Before separation the liquid can be reheated preferably to a temperature of 90-95° in vessel nr2 to be able to perform the separation process. Via a pump the fat/water-mixture will be transported to a liquid/liquid-separator wherein, for example due to difference in density fat can be separated from water.

The separated stickwater can be waste or edible and is classified as waste water and needs further processing such as purification before it can be discharged to the surface water. This involves high costs.

Figure 2A:
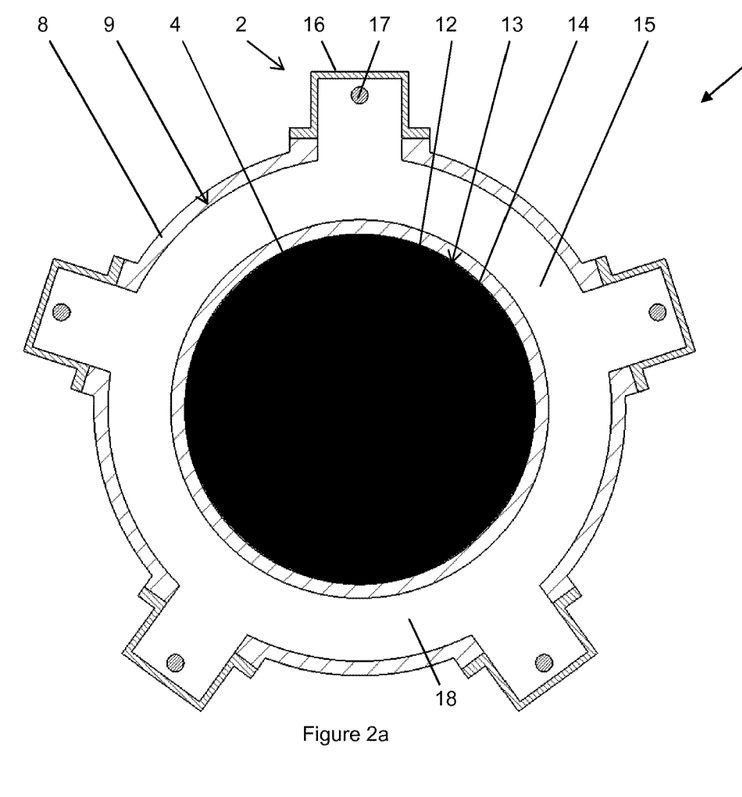
FIGS. 2*a* and 2*b* show an embodiment of the present invention.

An embodiment of a solid-state RF energized microwave apparatus is depicted in FIG. 2*a*, which comprises a multiple solid-state RF sources 2 which among other things each comprises a waveguide 16 and/or an antenna 17. In the present case, the inventive apparatus comprises a multitude of solid-state RF sources 2, which are provided at the circumference of a product chamber 14 and preferably, equidistantly around the circumference of the of the product chamber. The number of sources 2 in circumferential direction can depend on the efficiency, of the microwaves to heat up animal raw fat material 4, 11 evenly, measured for example the temperature rises per unit of time. The solid-state RF sources 2 are located in a chamber 15, in the present case defined by housing 8. The housing 8 can be similar to a Faraday cage to prevent electromagnetic waves coming out of the housing. At least inner wall 9 but preferably the entire housing 8 can be made of steel, for instance stainless steel. Inside the chamber 15 and/or inside the housing 8, a product chamber 14, here a microwave tube 12 is provided, which separates the product chamber 14 from the chamber 15, in which the solid-state RF sources 2 are located. The tube material is preferably at least partially, more preferably completely transparent for the microwave energy supplied by the solid-state RF sources 2 and more preferably do not absorb microwave energy and will therefore not be heated up by the microwave energy but, if any, only heated up by the warmed-up animal raw fat material without the build-up of deposit on the inner wall of the tube. To effectively convert the microwave energy into increased temperature of the animal raw fat material to be heated, the material of the tube 12 is not metal, but certain plastic materials and/or quartz-materials are suitable, which are more preferably food grade. The animal raw fat material 4, 11 is located within the product chamber 14 and will be treated, preferably heated by one preferably multiple solid-state sources 2 located in chamber 15. This embodiment is, for example, preferred in case cleaning agents used to clean product chamber 14 may not be come in contact with the solid-state sources 2. The tube 12 can also be used to direct the animal raw fat material past the solid-state RF sources 2. In this case, the animal raw fat material touches the inner circumference of tube at least locally. If needed, the chamber 15, which surrounds the tube 12 may be cooled to cool the RF-sources.

Figure 3A:
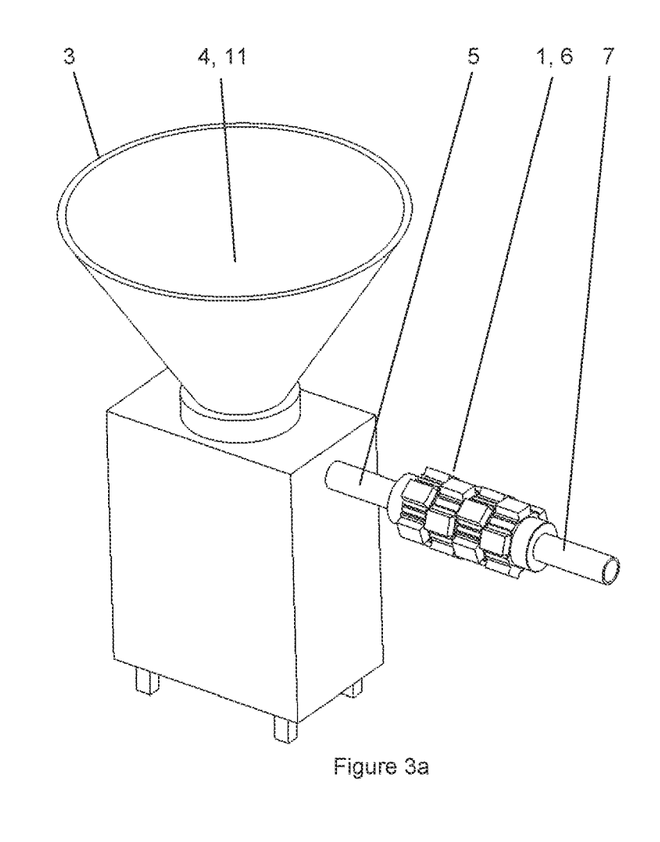
FIGS. 3*a-d* show an embodiment of the present invention.
Figures 3B, 3C, 3D:
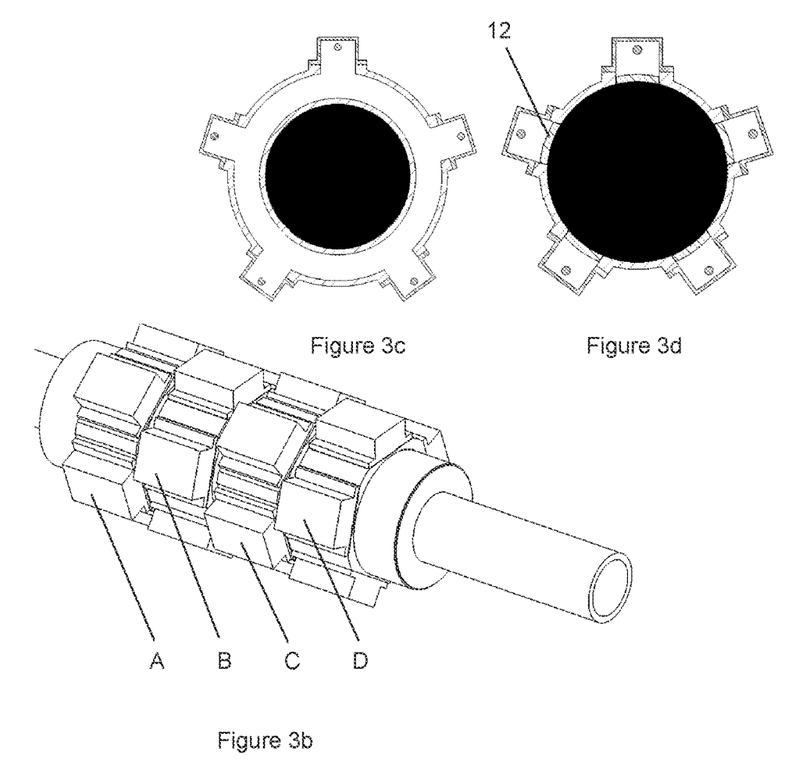

FIGS. 3a-3d depict a solid-state RF energized microwave apparatus in a line. A mass supply system 3 such as a grinder or a hopper, for example comprising a positive displacement pump which forces the animal raw fat material 4, 11, preferably through a supply section 5, to a microwave section part 6 of the inventive apparatus 1 to inline heat the pumpable substance and from there the heated mass is discharged via discharge section 7. A further process step can be extraction of fats and other usable ingredients. The food mass for instance ground pork mass can be transported continuously or intermittently/batch wise. The flow can be controlled depending on the residence time needed to achieve a certain temperature rise in the animal raw fat material 4, 11. The tube via which the food mass is pumped may comprise means to mix the animal raw fat material 4, 11, for example a static- and/or dynamic mixers. There may be a or multiple sensor(s) provided to measure, for example, the temperature rise. FIGS. 3a-3b depict the arrangement of the solid-state RF heat sources 2, here in four rows A, B, C and D. Each row comprises a multitude of, preferably equidistantly, arranged solid-state radio frequency sources, wherein here, the rows are staggered relative to each other. A cross-sectional view of row B of the microwave section 6 is depicted in FIG. 3c and can be similar as depicted in the embodiment according to FIG. 2a. In cross-sectional view in FIG. 3d microwave transparent inserts 12 are used to prevent that the solid-state RF energy sources 2 will come into contact with the mass. In order to further optimize the heat distribution to the mass flow the number of cylindrical solid-state radio frequency source arrangements, here rings, can be increased in number, from here four to >four.

Figure 4A:
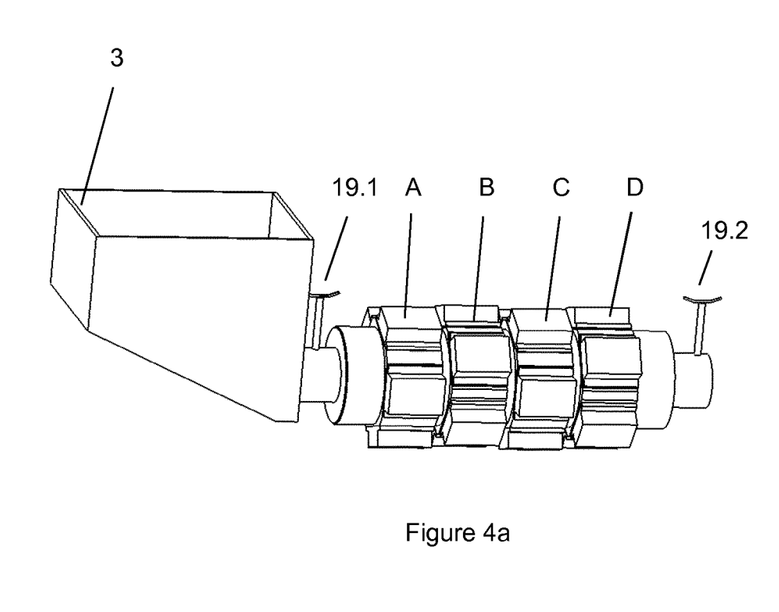
FIGS. 4*a-c* show an embodiment of the present invention.
Figure 4B:
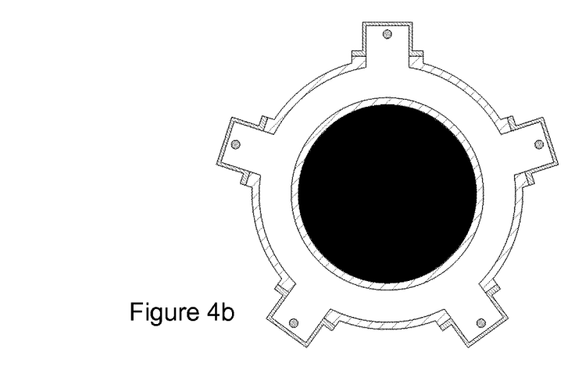
Figure 4C:
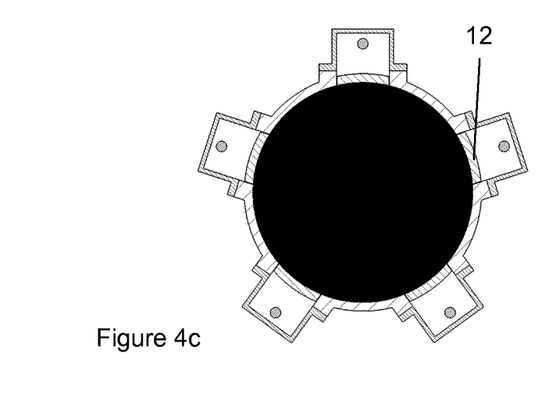

FIG. 4a depicts a solid-state RF energized microwave apparatus in a line wherein animal raw fat material 4, 11 will be supplied to mass supply system 3, here a hopper or a trough. The valve 19.2 downstream from the microwave section is closed and valve 19.1, upstream from the microwave section is open to receive the mass within microwave section 6 of microwave apparatus 1. After closing valve 19.1 the microwave apparatus will be started and after the mass 4, 11 is sufficiently heat treated valve 19.2 will be opened and the mass can be conveyed via for instance a pump and/or conveyor 10 (not depicted) to a further processing station. A cross view of row B in microwave section 6 is depicted in FIG. 4b and FIG. 4c.

Figure 5A:
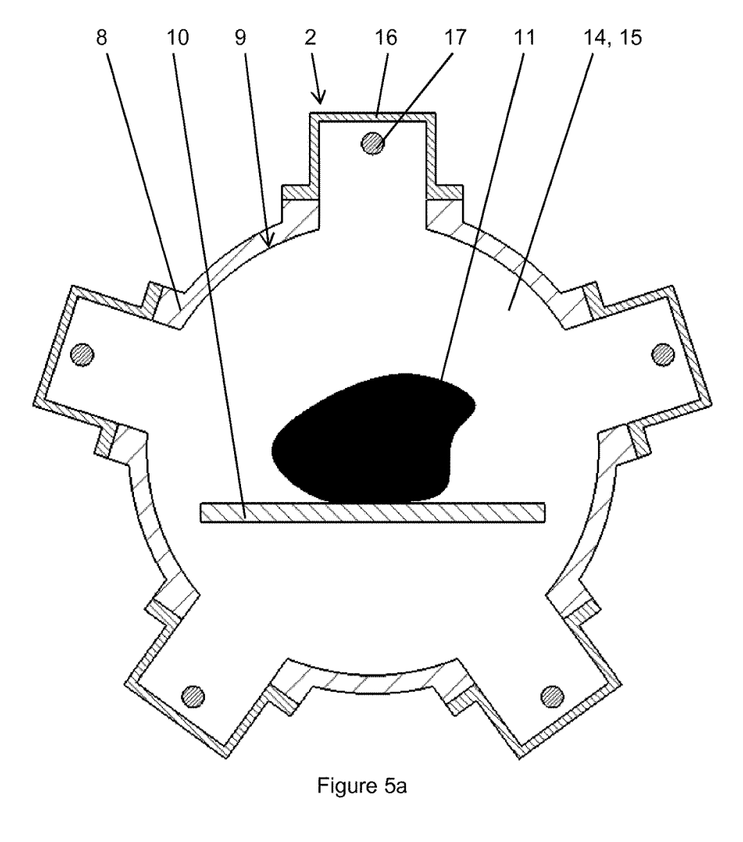
FIGS. 5-8 show an embodiment of the present invention using a conveyor.
Figure 5B:
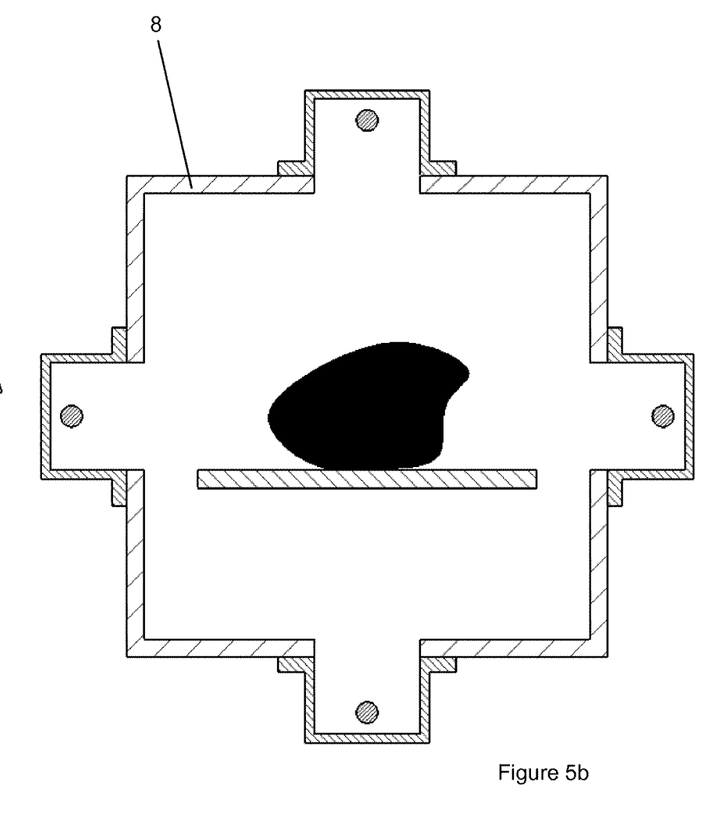
Figure 5C:
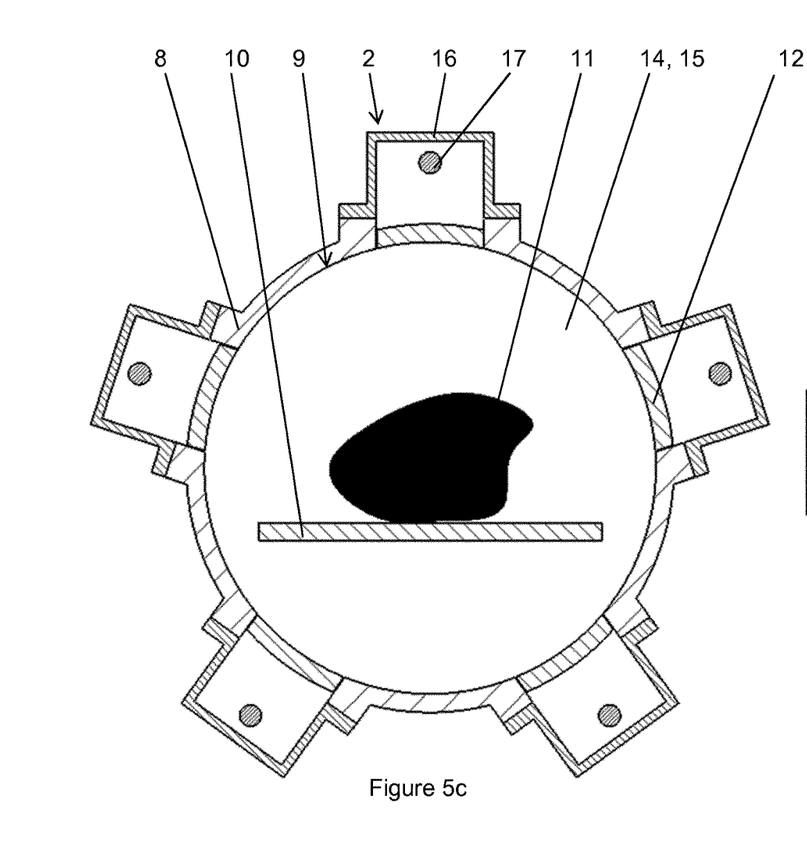
Figure 5D:
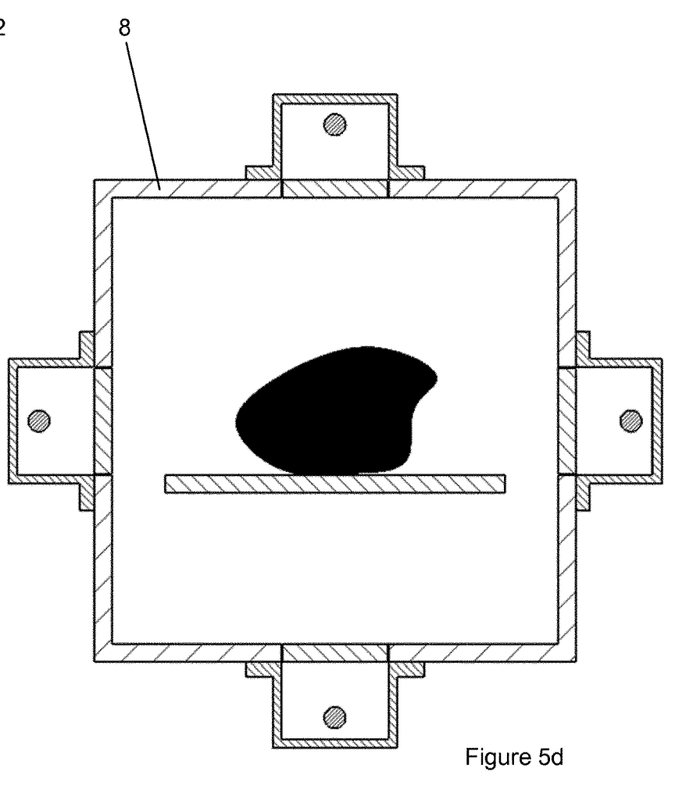

Another embodiment of the invention is depicted in FIG. 5a, which comprises one, but preferably multiple solid-state RF sources 2 which among other things each comprises a waveguide 16 and/or an antenna 17 and wherein conveyor means 10 for instance a conveyor belt is positioned within housing 8 and conveys animal raw fat material 11, e.g. a formed product, through housing 8. However, it is also possible to place a batch animal raw fat material 11 into the product chamber, treat it with RF-radiation and remove it, once the treatment is terminated. The placement of the batch can be executed by motor means. FIG. 5b depicts a square design of housing 8. FIG. 5c is an embodiment of FIG. 5a and FIG. 5d is an embodiment of FIG. 5b and both are provided with preferably microwave transparent insert 12 in order to prevent that particles from animal raw fat material 11 will come in contact with the solid-state RF energy sources. In this embodiment the shielding means are designed circular and co-radial with inner wall 9 of housing 8. The design of the shielding means is not limited to this design, for instance flat shielding means is also possible but due to hygienic reasons not preferable. Other than that, the explanations regarding FIGS. 5a and 5c also apply to FIGS. 5b and 5d.

Figure 6A:
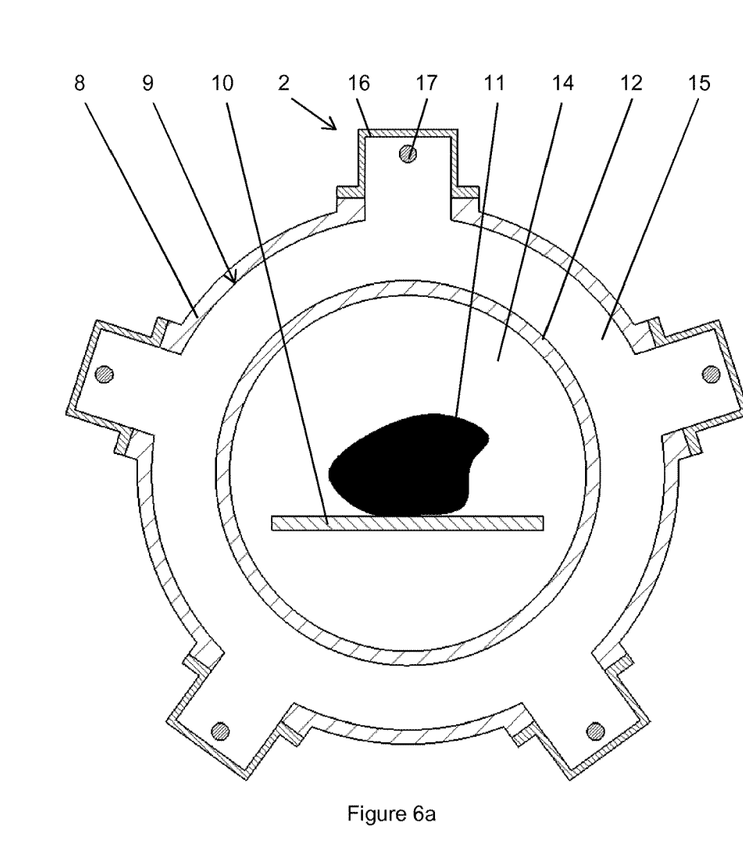
Figure 6B:
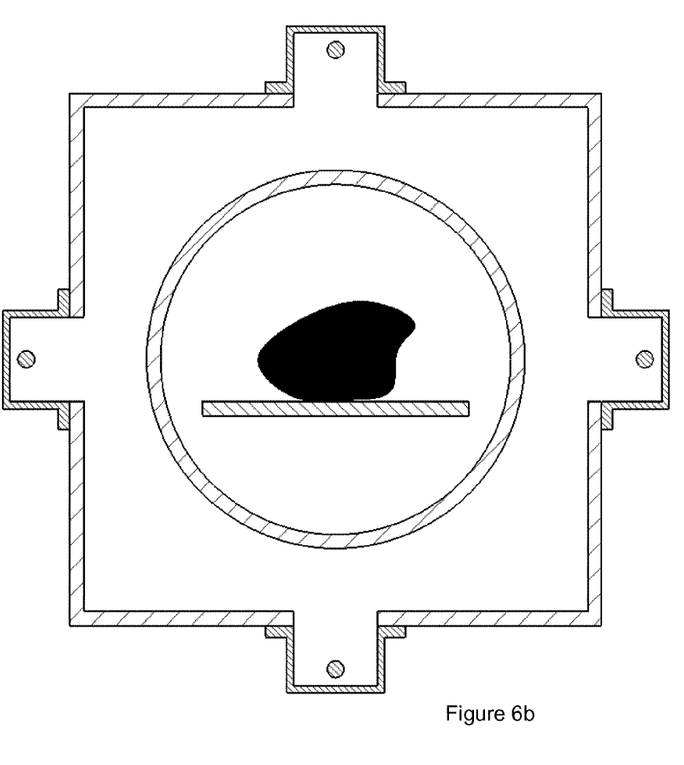

FIGS. 6a and 6b depict a second embodiment of the inventive apparatus, wherein in contrast to the embodiments according to FIGS. 5a and 5b a microwave tube 12 is provided. The explanations given regarding the embodiment according to FIGS. 5a and 5b also apply to this embodiment. The microwave tube 12 separates the product chamber 14 from the chamber 15, in which the solid-state RF sources 2 are located. The tube material is preferably transparent for microwaves supplied by the solid-state RF sources 2 and more preferably do not absorb microwave energy and will therefore not be heated up by the microwave energy but, if any, only heated up by the warmed-up animal raw fat material. To effectively convert the microwave energy into increased temperature of the animal raw fat material 11 to be heated, the material of the tube 12 is not be metal, but certain plastic materials are suitable. Animal raw fat material 11 is located within the product chamber 14 and will be treated, preferably heated by one preferably multiple solid-state sources 2 located in chamber 15. This embodiment is, for example, preferred in case cleaning agents used to clean product chamber 14 may not be come in contact with the solid-state sources 2.

Figure 7A:
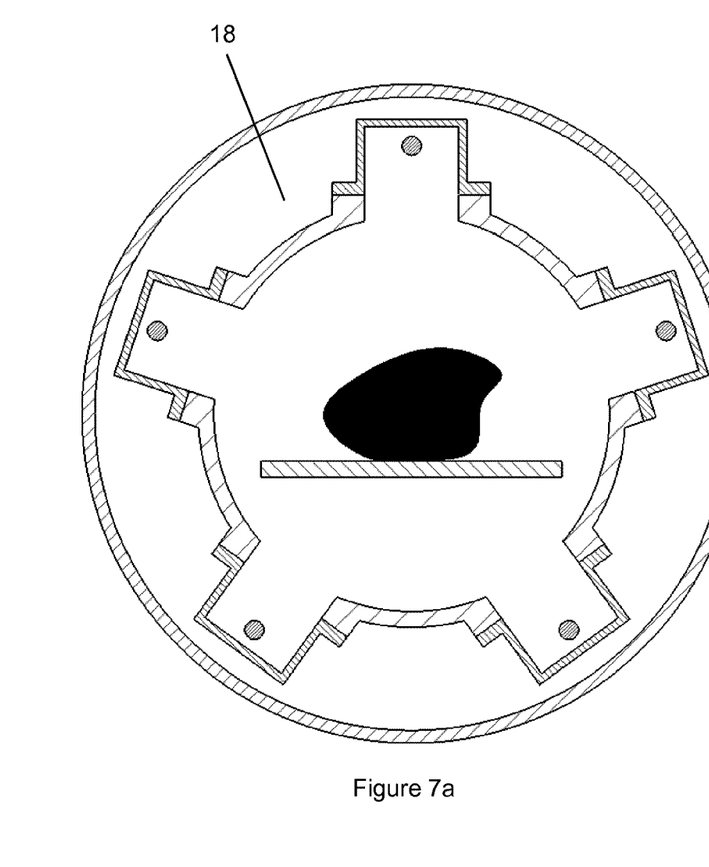
Figure 7B:
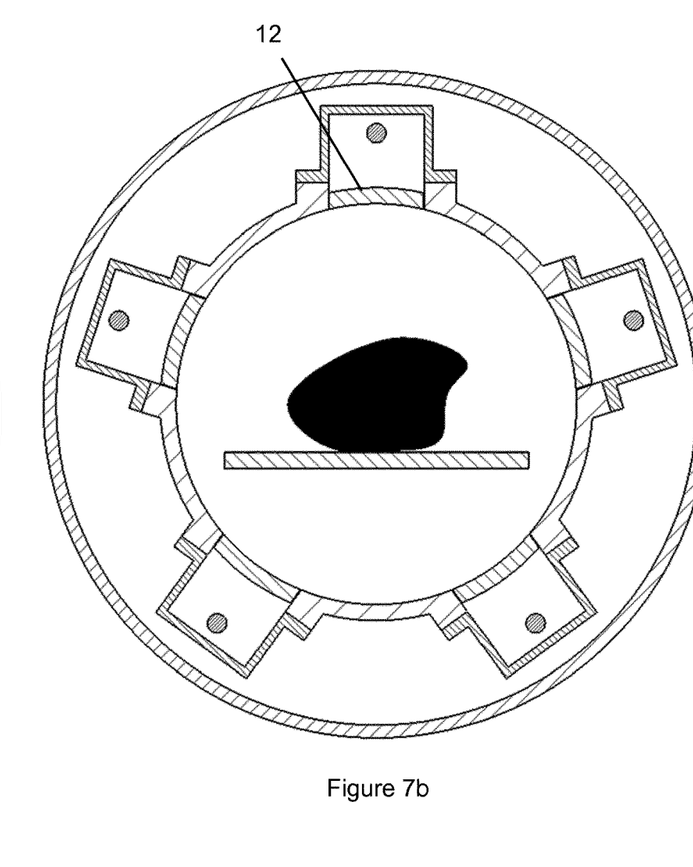

FIG. 7a and FIG. 7b (with microwave transparent insert 12) depict an embodiment related to FIG. 5a but will also apply to the embodiments according to FIGS. 5b-6b wherein a cooling chamber 18 is provided which is connected to a cooling circuit for instance a water cooling or a gas-, preferably air cooling circuit. The cooling chamber 18 surrounds the apparatus as depicted in FIG. 7. While applying solid-state RF energy sources, microwave energy will be transmitted to a certain spot of animal raw fat material 4, 11 to be treated only when needed. Despite this efficient energy management additional cooling of the waveguides and connected antennas may be desirable in case of high energy output, for example during a long period of time. In another not depicted embodiment also the solid-state RF energy source will be cooled as well as the power supply. This can be done per RF energy source as needed. The cooling of the RF energy source(s) is preferably controlled by a temperature measurement, which measures the temperature of one or more of the RF energy source and based on this reading controls a fluid flow of the cooling agent and/or its temperature.

Figures 8A, 8B:
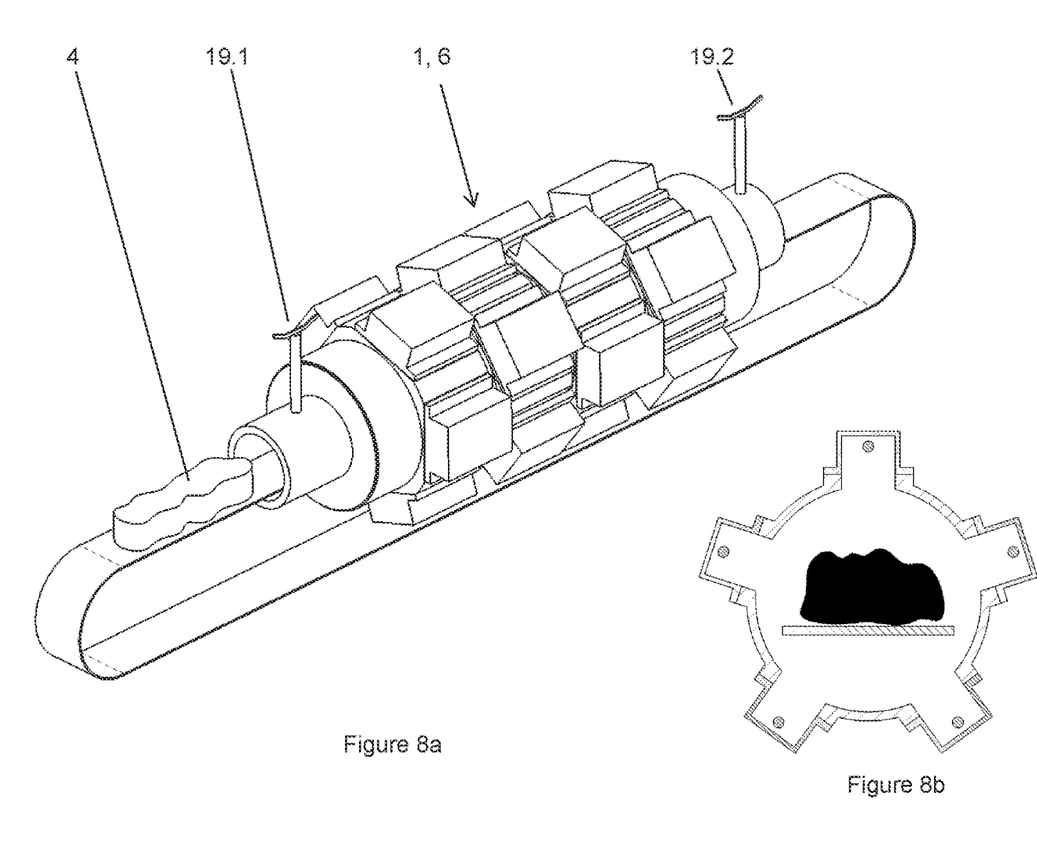
Figure 8C:
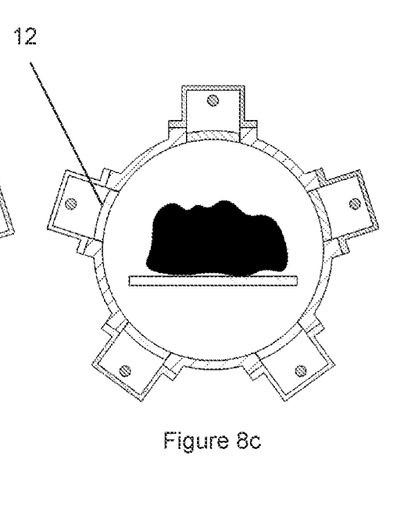

In a further embodiment of the invention animal raw fat material 4 will be deposited on a conveyor as depicted in FIG. 8a and from there on conveyed to microwave apparatus 1. A cross view of row B in microwave section 6 is depicted in FIG. 8b and is similar to FIG. 5f pa. The embodiment of FIG. 8c is comparable to FIG. 5c. The valves in FIG. 8 are not mandatory.

Figure 2B:
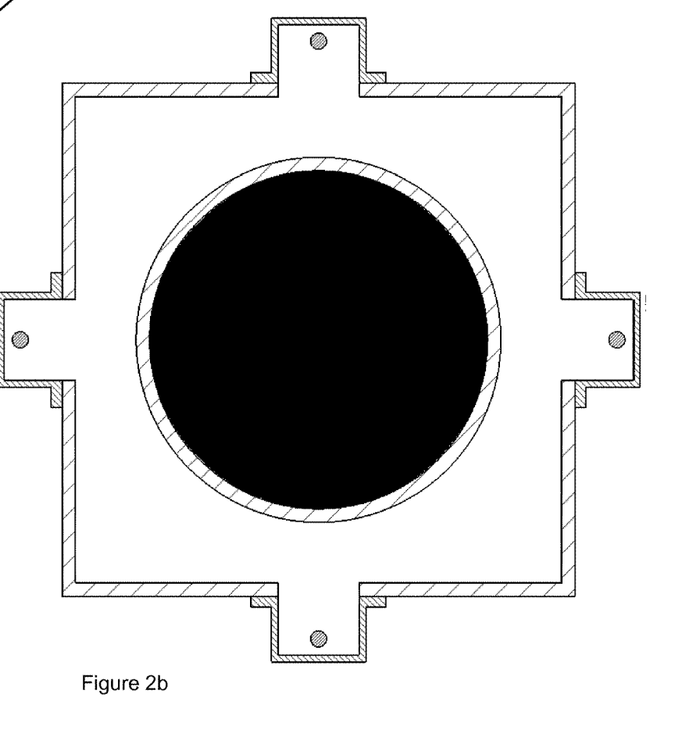

The design of housing 8 is not limited to a circular design such as depicted in FIG. 2a but can be shaped differently as depicted in FIG. 2b. Important is that heat treatment of animal raw fat material 4, 11 will not adversely affected by the bouncing microwaves via inner wall 9 of housing 8.

The design of microwave tube 12 is not limited to a circular design but can be shaped differently. Especially in case a mass 4 flows through the tube as depicted in FIG. 2a circular design is advantageous with respect to pressure distribution. Preferably inner wall 13 should be provided with smooth walls in order to reduce shear forces on the food mass and to facilitate cleaning. Microwave tube 12 is preferably a fixed part within the depicted assembly and is isolated with respect to housing 8 and solid-state RF energy sources 2 which would be advantageous with respect to hygiene. Cleaning of the microwave tube can be done manually but preferably by an integrated CIP system.

Melting Fat—with Solid-State RF Energy Sources

In a first embodiment of the invention the first step of the process according to FIG. 1, the injection of steam in the melting tube is replaced by heating the meat animal raw fat material in a microwave chamber, for instance a tube which is transparent for microwaves.

In a second embodiment of the invention the first and second step (further heating the mass in a vessel nr1) of the process according to FIG. 1 can be combined in one process step and executed with the inventive apparatus. Solid-state energy sources will heat up the ground animal material. An improved temperature control and consequently an even heating of the animal raw fat material can be achieved due to preferred sensor- and control means based on for instance absorption measurement. No steam generator is needed anymore to perform the first and second step. No steam is directly added to the animal raw fat material mass.

The heating during separation can also be executed with the inventive apparatus.

By eliminating the addition of steam to heat up the animal material, the amount of water, i.e. condensate and/or stickwater, i.e. water containing proteins, will be reduced. Liquid fat separation will be easier due to the lower concentration of water in the heated animal material. Consequently, the cost of separating, purifying and discharging water and in general the total cost of energy will be reduced. However, a liquid/liquid-separator is preferred to eliminate the cellwater from the fat.

LIST OF REFERENCE SIGNS 1 processing apparatus, industrial processing apparatus
2 solid-state RF energy source
3 mass supply system
4 animal material, animal raw fat material
5 supply section, entrance
6 microwave section, treatment section
7 discharge section
8 housing
9 inner wall of the housing
10 conveyor means
11 animal material, animal raw fat material
12 microwave chamber, microwave tube, microwave transparent insert
13 inner wall of the microwave tube
14 product chamber
15 solid-state source chamber
16 waveguide
17 antenna
18 cooling unit
19.1 valve
19.2 valve
Nr1 vessel
Nr2 vessel
A solid-state RF energy source
B solid-state RF energy source
C solid-state RF energy source
D solid-state RF energy source

The invention claimed is:

1. Processing apparatus to melt animal fat, in which an animal raw fat material is transported by a pump, through a microwave chamber and thereby heated,
   wherein the processing apparatus comprises at least one solid-state radio frequency source that is configured to generate microwave energy, one or more sensors, and a control system,
   wherein the at least one solid-state radio frequency source is configured to generate and transmit the microwave energy to the animal raw fat material to heat the animal raw fat material, the one or more sensors are configured to measure the microwave energy that is reflected from the animal raw fat material, and the control system is configured to compare the transmitted microwave energy to the reflected microwave energy and then, based on the comparison, the control system is configured to adjust any additional microwave energy that is transmitted by the at least one solid-state radio frequency source to the animal raw fat material.

2. Processing apparatus according to claim 1, wherein the microwave chamber is at least essentially transparent for the microwave energy.

3. Processing apparatus according to claim 1, wherein the at least one solid-state radio frequency source comprises a multitude of solid-state radio frequency sources that are provided in an array of n columns and m rows, wherein n is an integer >1 and m is an integer ≥1.

4. Processing apparatus according to claim 1, wherein the at least one solid-state radio frequency source comprises a multitude of solid-state radio frequency sources that are provided equidistantly around a circumference of a product chamber.

5. Processing apparatus according to claim 1, wherein the processing apparatus comprises an inlet and an outlet, which are spaced apart from each other.

6. Processing apparatus according to claim 1, wherein the pump is configured to transport the animal raw fat material past the at least one solid-state radio frequency source.

7. Processing apparatus according to claim 1, wherein the at least one solid-state radio frequency source is a plurality of solid-state RF sources that are provided at a circumference of the microwave chamber and are arranged equidistantly around the circumference of the of the microwave chamber, the plurality of solid-state RF sources are spaced 90 degrees apart or 72 degrees apart.

8. Processing apparatus according to claim 7, wherein the processing apparatus comprises a cooling chamber that is connected to a cooling circuit, the cooling chamber surrounds the processing apparatus.

9. Processing apparatus according to claim 8, wherein the processing apparatus comprises a mixing device, the mixing device is a static mixer.

10. Processing apparatus according to claim 1, wherein the one or more sensors sense the microwave energy that is absorbed by the animal raw fat material.

11. Processing apparatus according to claim 1, wherein the pump is controlled based on a signal from the one or more sensors, and a capacity of the pump is increased or decreased to alter a residence time of the animal raw fat material in the microwave chamber.

12. Processing apparatus according to claim 1, wherein the animal raw fat material is heated by the at least one solid-state radio frequency source until a point at which fat in the animal raw fat material becomes liquid, the liquid is separated from a remaining texture of the animal raw fat material in the processing apparatus.

13. Processing apparatus according to claim 12, wherein the processing apparatus comprises a grinder for crushing the animal raw fat material, and the animal raw fat material is crushed before the animal raw fat material is heated.

14. Processing apparatus according to claim 13, wherein the control system is configured to control the grinder and the pump.

15. Processing apparatus according to claim 10, wherein the control system is configured to stop transmission of the microwave energy from the at least one solid-state radio frequency source when no energy is absorbed in the microwave chamber.

16. Processing apparatus according to claim 15, wherein no microwave energy is absorbed in the microwave chamber occurs when no load is present in the microwave chamber, and wherein the animal raw fat material is transported continuously and/or intermittently prior, during and/or after the heating.

17. Processing apparatus according to claim 1, wherein the at least one solid-state radio frequency source comprises a plurality of solid-state radio frequency sources that are each configured to generate the microwave energy, wherein the processing apparatus comprises a supply section and an opposing discharge section, the plurality of solid-state radio frequency sources are arranged in a plurality of circumferential rings extending around a longitudinal axis of the processing apparatus between the supply section and the opposing discharge section, wherein the plurality of solid-state radio frequency sources in one of the plurality of circumferential rows is rotationally staggered about the longitudinal axis relative to the plurality of solid-state radio frequency sources in an adjacent one of the plurality of circumferential rows.

18. Processing apparatus according to claim 1, wherein the at least one solid-state radio frequency source comprises a plurality of solid-state radio frequency sources that are each configured to generate the microwave energy, wherein the processing apparatus comprises a supply section and an opposing discharge section, the plurality of solid-state radio frequency sources are arranged in a plurality of circumferential rings extending around a longitudinal axis of the processing apparatus between the supply section and the opposing discharge section, wherein the plurality of solid-state radio frequency sources in one of the plurality of circumferential rows is rotationally staggered about the longitudinal axis relative to the plurality of solid-state radio frequency sources in an adjacent one of the plurality of circumferential rows.

19. A processing apparatus comprising:
a microwave chamber;
a pump that transports animal raw fat material through the microwave chamber;
at least one solid-state radio frequency source that is configured to generate and transmit microwave energy to the animal raw fat material to heat the animal raw fat material;
one or more sensors that are configured to measure the microwave energy that is reflected from the animal raw fat material;
a control system that is configured to:
  a) compare the transmitted reflected microwave energy from the at least one solid-state radio frequency to the reflected microwave energy from the animal raw fat material; and
  b) adjust any additional microwave energy transmitted by the at least one solid-state radio frequency source to the animal raw fat material based on the comparison; and
  c) stop a transmission of the microwave energy from the at least one solid-state radio frequency source when no microwave energy is absorbed in the product chamber, which occurs when no load is present in the microwave chamber;
a microwave tube that separates the microwave chamber from a chamber in which the at least one solid-state radio frequency source is located;
a cooling chamber that is connected to a cooling circuit, the cooling chamber surrounds the processing apparatus;
wherein the pump is controlled based on a signal from the one or more sensors and a capacity of the pump is increased or decreased to alter a residence time of the animal raw fat material in the product chamber.

20. The processing apparatus according to claim 19, wherein a material of the microwave tube is not metal; the at least one solid-state radio frequency source comprises a multitude of solid-state radio frequency sources that are provided equidistantly around the circumference of a product chamber; and the animal raw fat material is heated by the at least one solid-state radio frequency source until a point at which fat in the animal raw fat material becomes liquid so that the liquid can be separated from a remaining texture of the animal raw fat material.

* * * * *